(12) United States Patent
Denilson et al.

(10) Patent No.: US 8,906,994 B2
(45) Date of Patent: Dec. 9, 2014

(54) COATING SYSTEMS COMPRISING DIOXOLANE FILM-FORMING AGENTS

(75) Inventors: José Vicentim Denilson, Campinas (BR); Roberto Garbelotto Paulo, Campinas (BR); Iacovone Aires, São Paulo (BR)

(73) Assignee: Rhodia Poliamida e Especialdades Ltda, Sao Paulo (BR)

( * ) Notice: Subject to any disclaimer, the term of this patent is extended or adjusted under 35 U.S.C. 154(b) by 1089 days.

(21) Appl. No.: 12/525,728

(22) PCT Filed: Jan. 30, 2008

(86) PCT No.: PCT/IB2008/000286
§ 371 (c)(1),
(2), (4) Date: Dec. 21, 2009

(87) PCT Pub. No.: WO2008/096255
PCT Pub. Date: Aug. 14, 2008

(65) Prior Publication Data
US 2010/0137480 A1    Jun. 3, 2010

(30) Foreign Application Priority Data
Feb. 5, 2007    (FR) .................................... 07 00787

(51) Int. Cl.
| | | |
|---|---|---|
| *C08K 5/1565* | (2006.01) | |
| *C08G 18/28* | (2006.01) | |
| *C09D 7/12* | (2006.01) | |
| *C09D 175/04* | (2006.01) | |
| *C09D 7/04* | (2006.01) | |

(52) U.S. Cl.
CPC .............. *C09D 7/04* (2013.01); *C08G 18/2815* (2013.01); *C08K 5/1565* (2013.01); *C09D 7/1233* (2013.01); *C09D 175/04* (2013.01)
USPC ........................... 524/379; 524/108; 508/402

(58) Field of Classification Search
USPC .................................. 524/379, 108; 528/402
See application file for complete search history.

(56) References Cited

U.S. PATENT DOCUMENTS 3,055,766 A * 9/1962 Reinhardt ................ 106/287.18

FOREIGN PATENT DOCUMENTS

| | | | |
|---|---|---|---|
| JP | 62084171 A | | 4/1987 |
| JP | 62156983 A | | 7/1987 |
| JP | 62241977 A | | 10/1987 |
| JP | 1013080 A | | 1/1989 |
| JP | 04 325539 A | | 11/1992 |
| JP | 04325539 A | * | 11/1992 |
| JP | 6073318 A | | 3/1994 |
| JP | 06 313100 A | | 11/1994 |
| JP | 06313100 A | * | 11/1994 |
| JP | 2003 183569 A | | 7/2003 |
| JP | 2003183569 A | * | 7/2003 |

\* cited by examiner

*Primary Examiner* — Kelechi Egwim
(74) *Attorney, Agent, or Firm* — Dentons US LLP

(57) ABSTRACT

Dioxolane compound film-forming agents are formulated into surface coating compositions such as paints and varnishes, in particular industrial, graphic and architectural paints, and serve as coalescence agents and/or drying retardants.

13 Claims, 14 Drawing Sheets

Figure 1A:
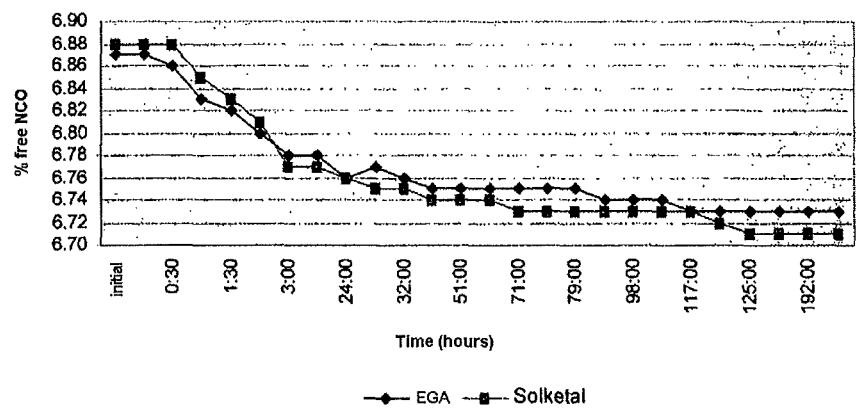

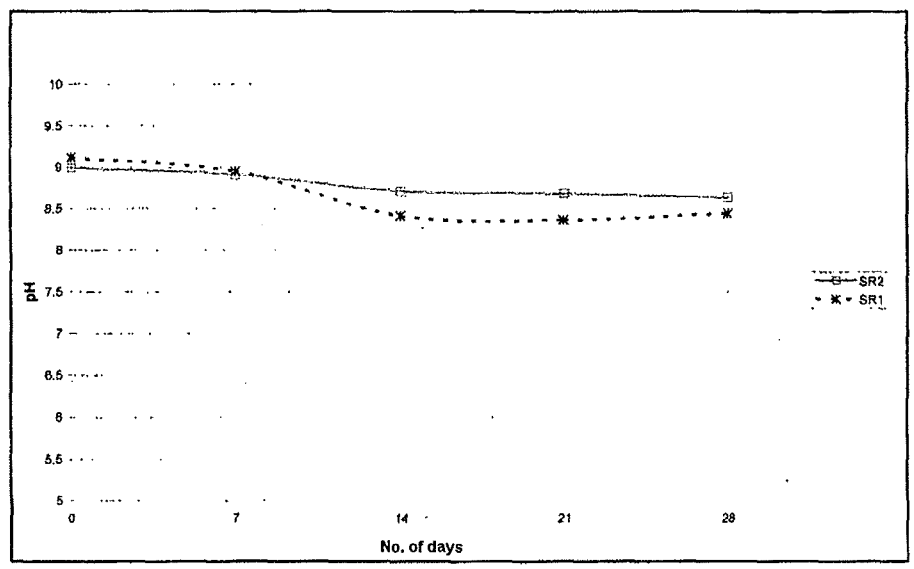
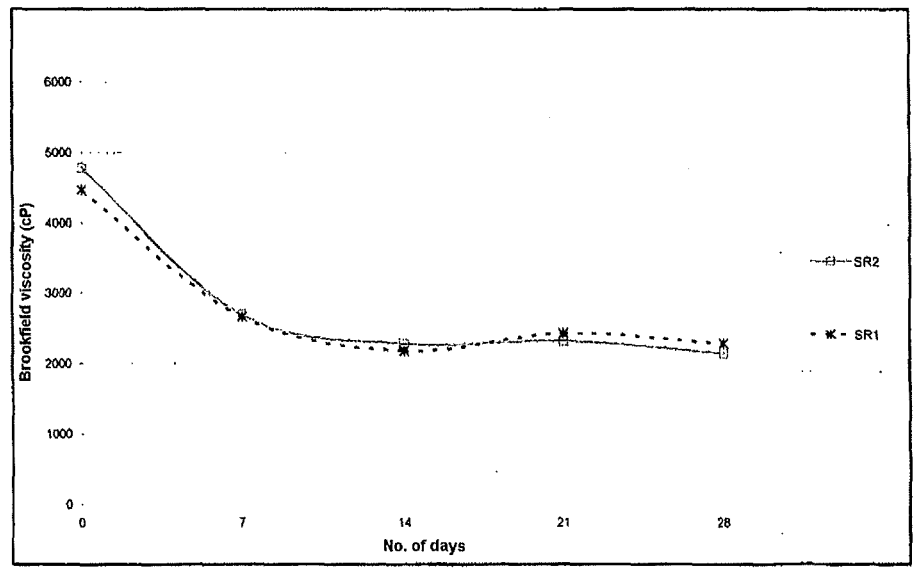

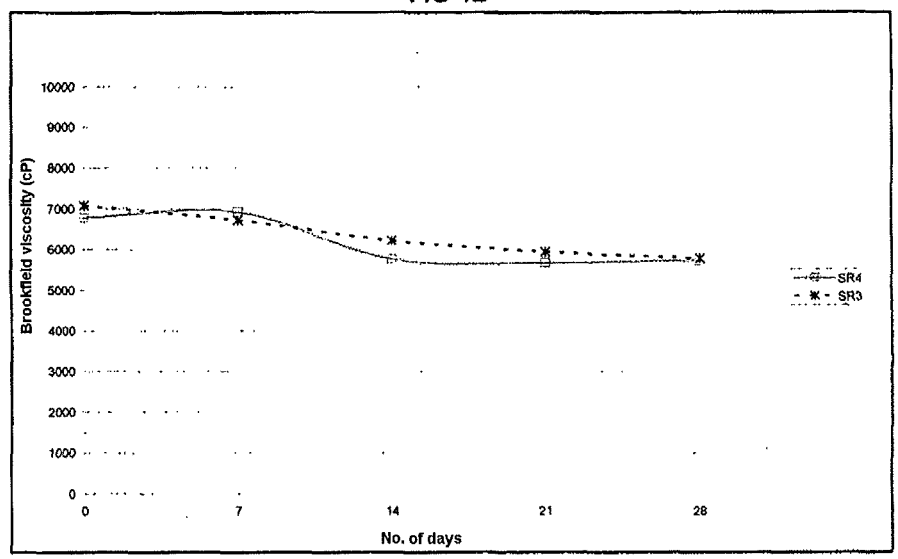
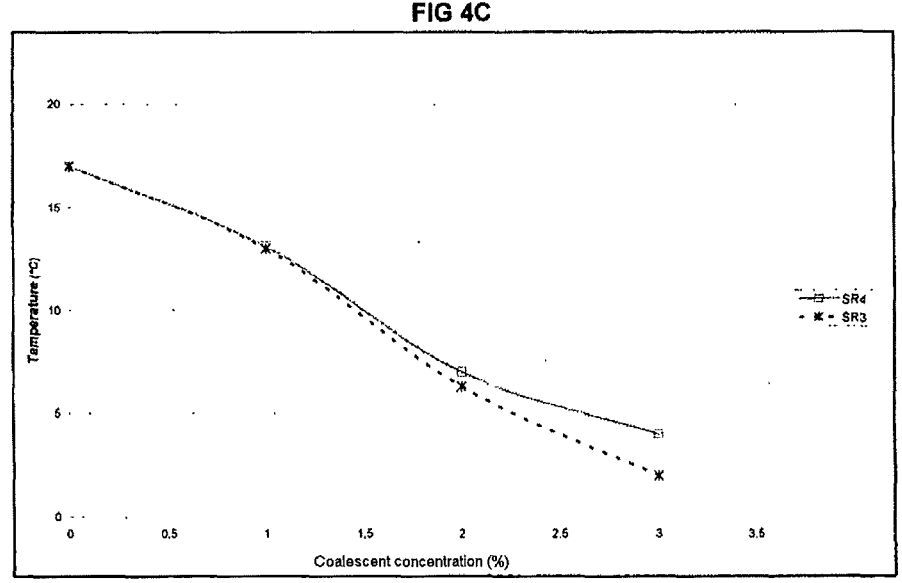

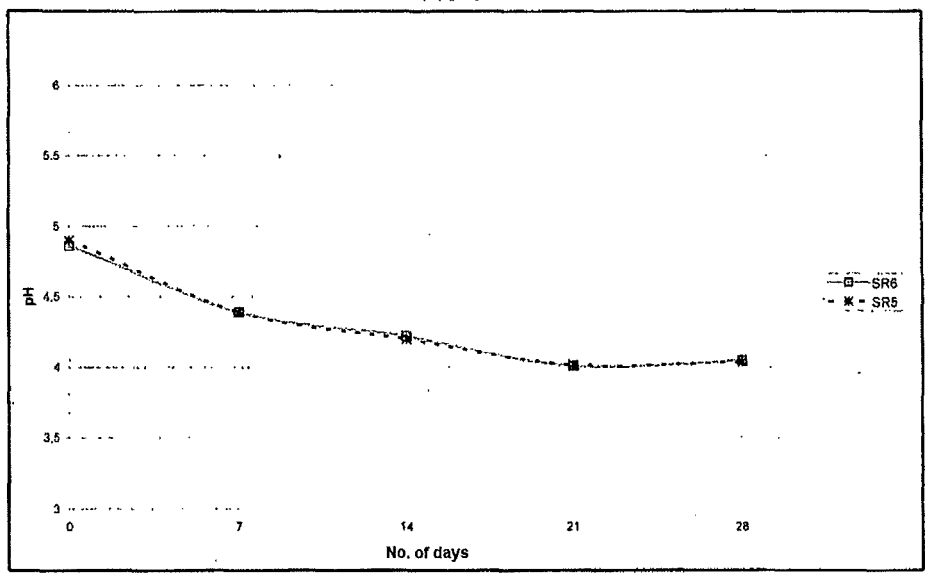
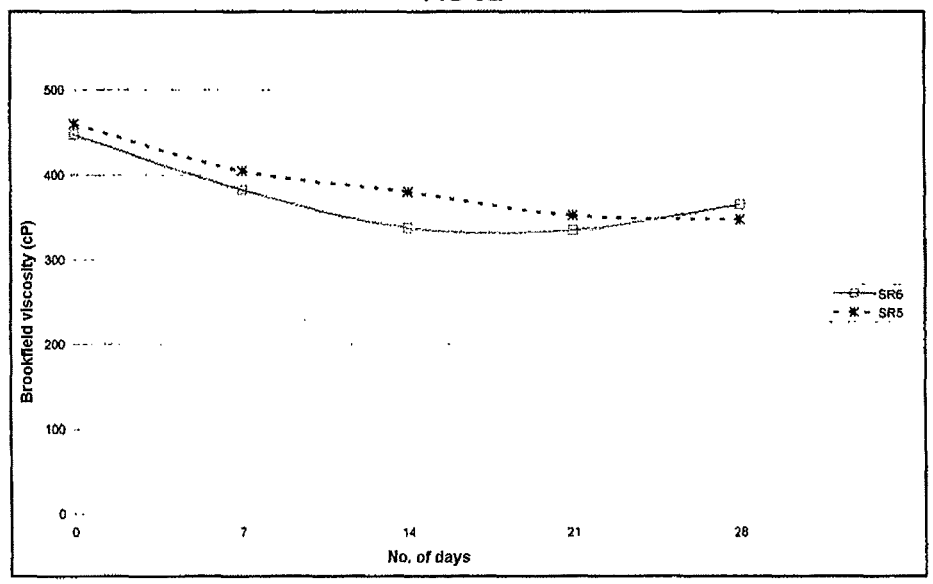

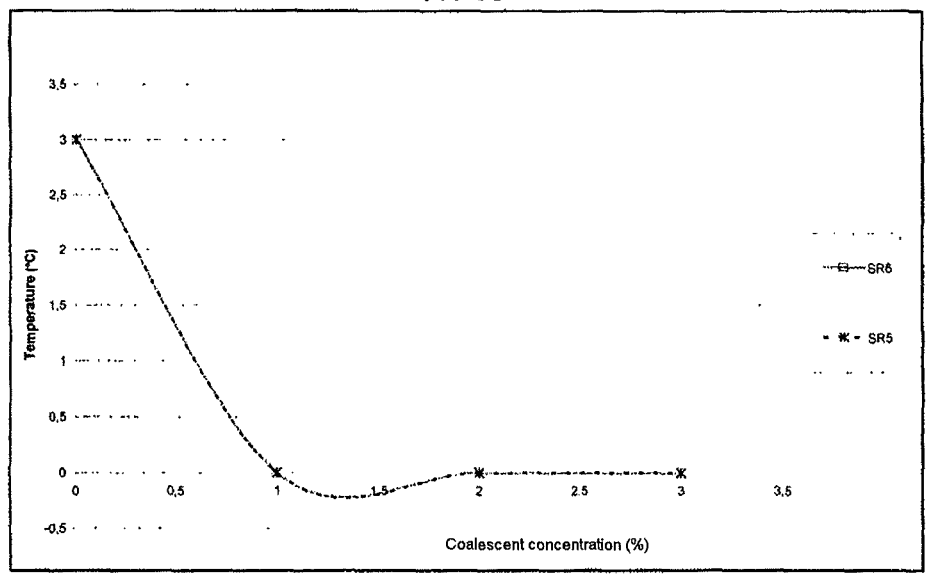
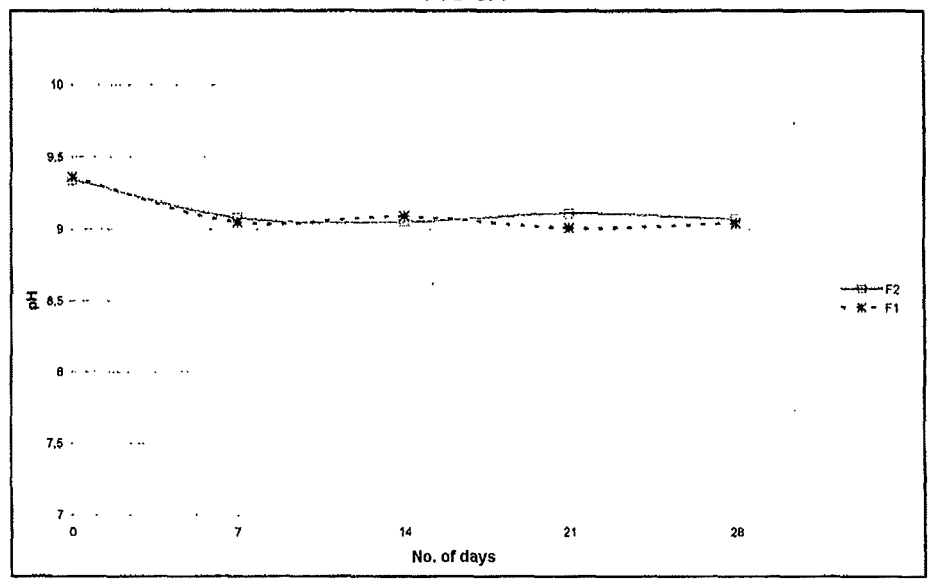

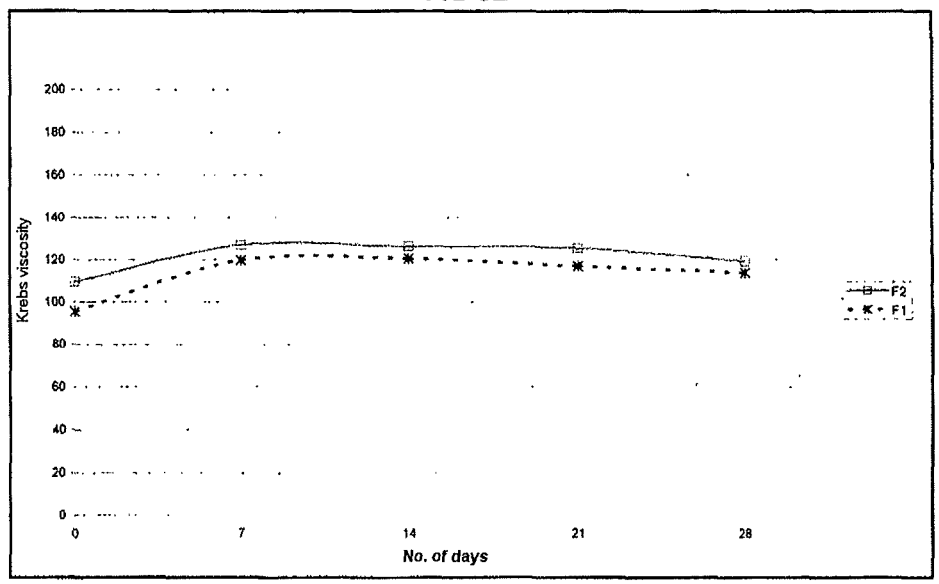
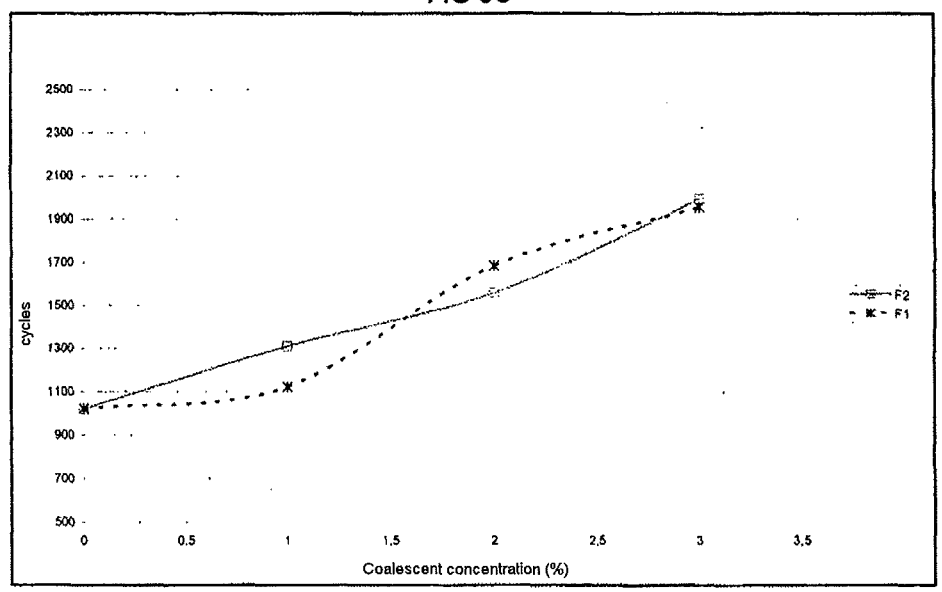

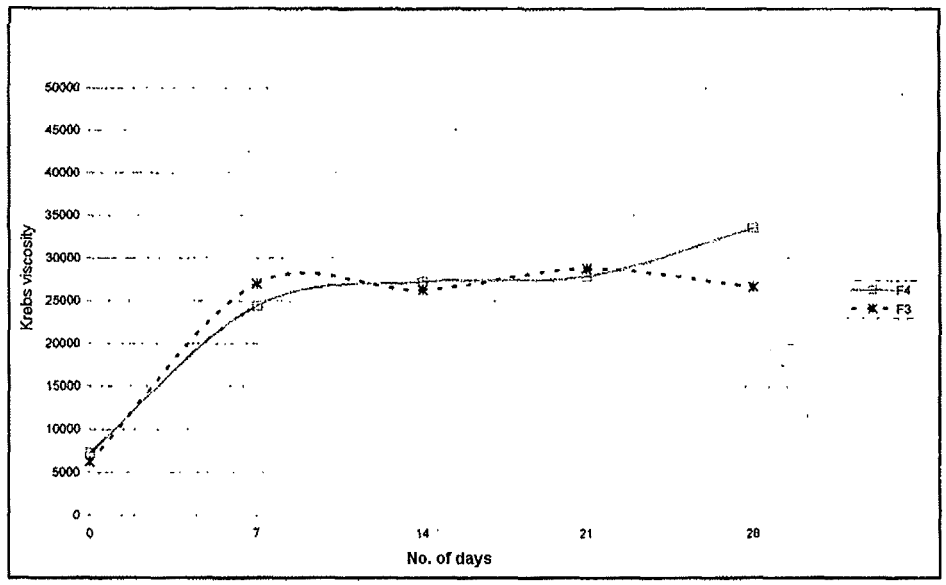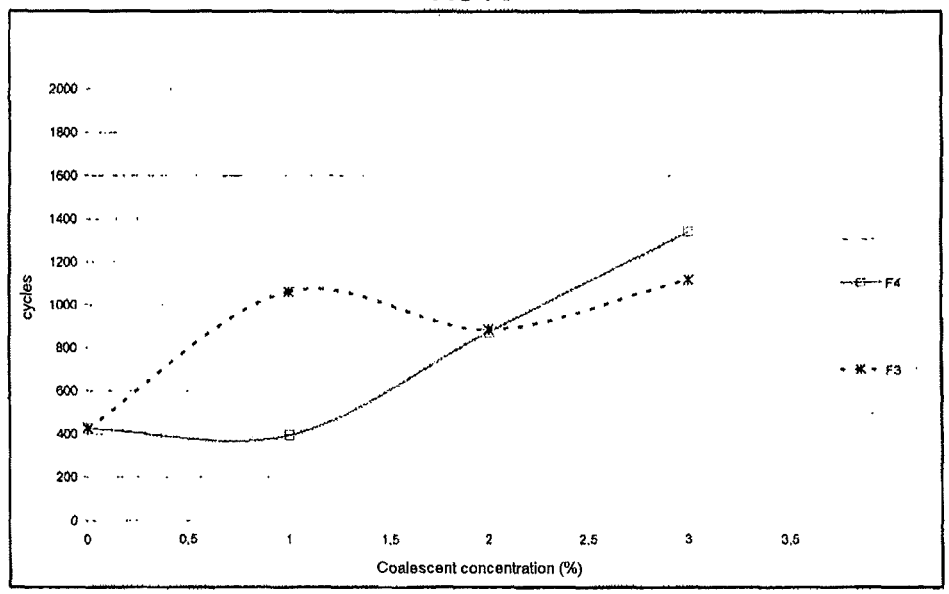

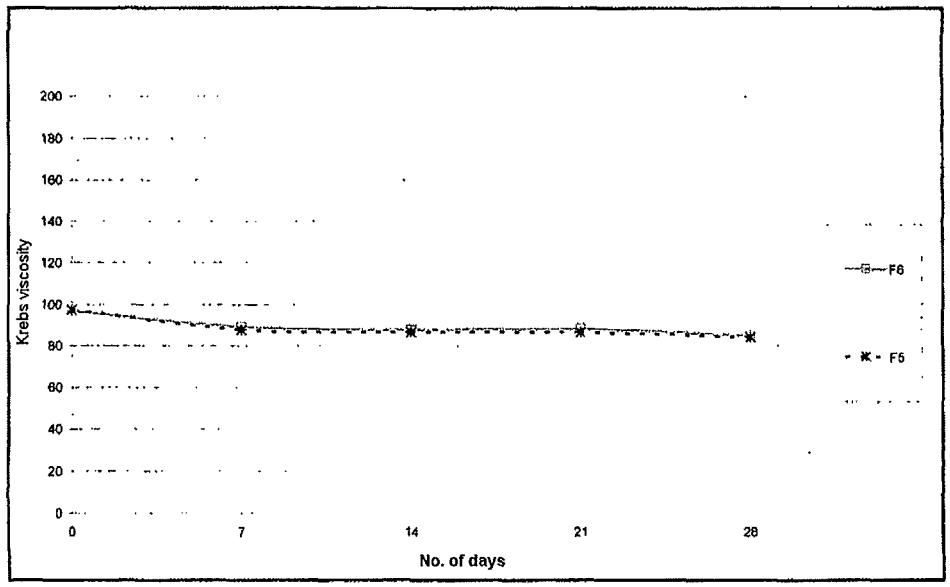
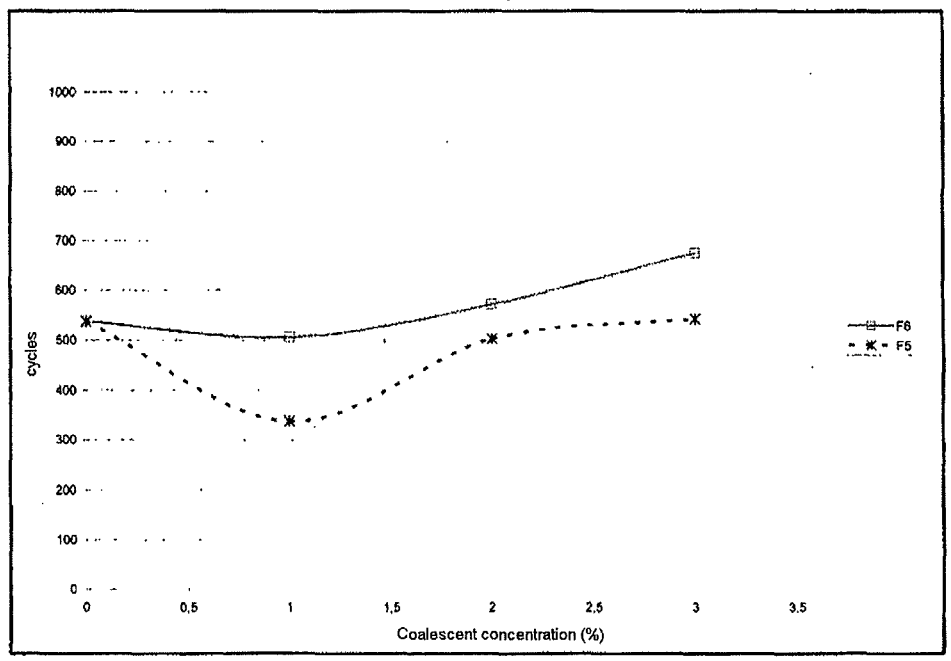

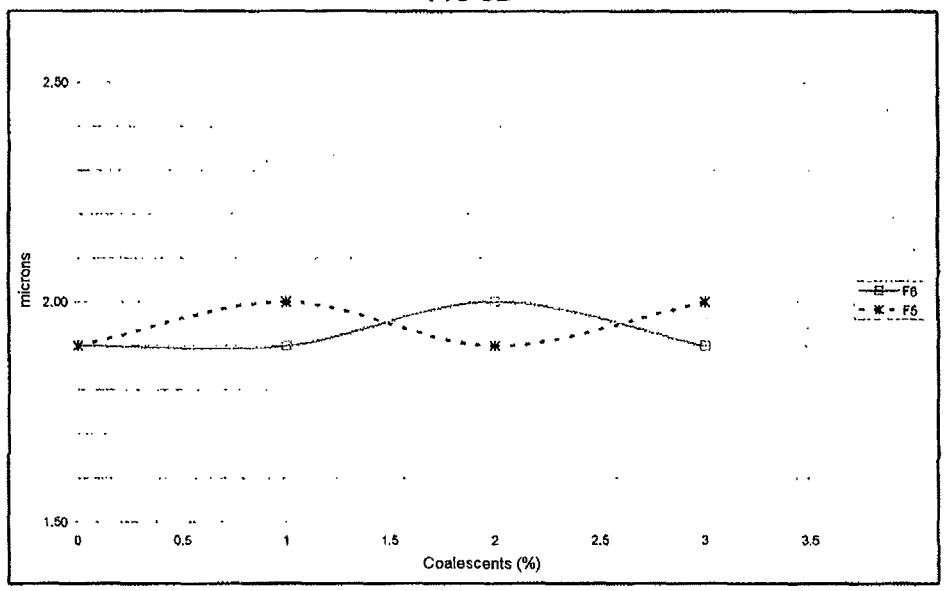

COATING SYSTEMS COMPRISING DIOXOLANE FILM-FORMING AGENTS

CROSS-REFERENCE TO PRIORITY/PCT APPLICATIONS

This application is a National Stage of PCT/IB 2008/000286, filed Jan. 30, 2008 and designating the United States (published in the French language on Aug. 14, 2008, as WO 2008/096255 A2; the title and abstract were published in French and English), which claims priority of FR 0700787, filed Feb. 5, 2007, each hereby expressly incorporated by reference in its entirety and each assigned to the assignee hereof.

Throughout the remainder of this text, architectural paints are understood to be water-based paints, and industrial paints, for example, on furniture, automotive OEM and refinish paints, are understood to be solvent-based paints—solely for reasons of simplifying the description, without implying the slightest limitation to the scope of the present invention.

Architectural paints are prized for their quality and their good appearance after application, from the standpoint of the finish, the coverage and the durability. These properties are a result of the quality of the components of the paint, such as the thickeners, the pigments, and the surfactants. In architectural paints, important components for obtaining good quality are the coalescents, which provide uniformity of contact between the particles, giving the film a good appearance in respect of gloss and durability, as a function of the abrasion resistance. Similarly, to ensure optimum application, the industrial paint must contain a balance in the composition of the solvent system, so that the drying time of the paint is appropriate, preventing the presence of undesirable flaws in the finish.

Some attempts to improve the quality of paints have already been disclosed, including the following:

Patent JP 62241977 describes the application of solvents derived from glycerol as a solvent for pen inks, providing good viscosity and making it possible, in particular, to obtain fine, smudge-free writing.

Patent JP 62156983 describes the application of solvents derived from the condensation of glycerol with an aldehyde or acetone, on the surfaces of printing materials, to give good absorption of the paint, and well-defined, smudge-free images.

Patent JP 62084171 describes the use of solvents derived from the condensation of glycerol with aldehydes or ketones in the manufacture of graphics paints with more rapid, smudge-free drying.

Patent JP 01013080 relates to the use of polyoxyalkylene solvents as solvents and emulsifiers for paints.

Patent JP 06073318 refers to the use of glycerol/acetone mixture as a solvent in the production of paint strippers.

The present invention differs from the interior art in the use of dioxolane derivatives as film formers, in other words as coalescents, or drying retarders in paint systems or paint formulations, especially industrial, architectural or graphics paints.

The term "film former" is used generically and denotes any additive which allows the coalescence of a system or the retardation in drying, for example, to be modified.

One important advantage lies in the fact that it is possible to maintain the quality of the paint system while using a smaller amount of additives relative to the amounts used for other known additives of the prior art.

In a difference from the prior art, the present invention uses one or more dioxolane derivatives as a film former, in other words not only as a coalescent intervening as a film-forming auxiliary in water-based systems, but also as a drying time retarder in solvent-based systems, in systems for coating substrates, especially in the paints used in the fields of industry, graphics or architecture.

A film former is understood to be an agent which, when present in the formulation of a coating, promotes the formation of the film on application to a substrate.

As is known to the skilled worker, the feature obtained when the drying time of a film is retarded is to allow better spreading of the paint and an accentuation of the gloss of the paint.

It is also known to the skilled worker that coalescents promote contact between the particles, facilitating and enhancing the formation of the film, thereby allowing the appearance and durability of the applied film—paint or varnish, for example—to be enhanced. These enhancements are in relation and a consequence of the decrease in the glass transition temperature and in the minimum film formation temperature (MFFT) which are generated by the coalescent.

According to the present invention, coalescents are understood to be substances which are used as a plasticizer, intervening as an auxiliary in the formation of films, and retarders are understood to be substances which modify the drying time, following the application of coating formulations to substrates.

The dioxolane derivatives used as film formers according to the present invention are those of the formula (I) below:

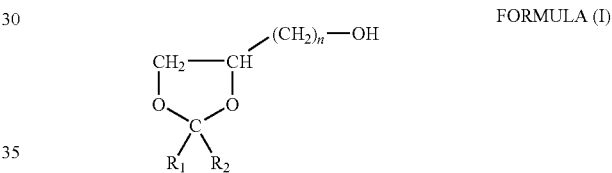

FORMULA (I)

in which: R1 and R2, which are identical or different, represent hydrogen or a group or radical selected from the group comprising at least alkyl, alkenyl or phenyl radicals, and n is an integer 1, 2, 3, 4 or 5.

In particular, R1 and R2 are radicals selected from the group comprising the methyl, ethyl, n-propyl, isopropyl or isobutyl radical.

Preferably n is 1 or 2.

In one preferred embodiment of the invention the dioxolane derivative of formula (I) of the present invention is 2,2-dimethyl-1,3-dioxolane-4-methanol, also known by the name solketal. This derivative is particularly advantageous as a coalescent for formulating a water-based coating.

In another preferred embodiment of the invention the dioxolane derivative of formula (I) of the present invention is 2,2-diisobutyl-1,3-dioxolane-4-methanol, also known by the acronym IIPG, for the synonym 1-isobutyl-isopropylidene glycerol. This derivative is particularly advantageous as a drying time retarder for formulation of a solvent-based coating.

The present invention also provides coating system formulations comprising as film former at least one dioxolane derivative. These formulations may in particular be water-based or based on nonaqueous solvent.

According to the present invention, the amounts of dioxolane derivative of the invention that are added to paint formulations to obtain the desired enhancement effect are markedly less than the amounts used with other known additives. Thus the amount used with the compound of the invention may be 10% of the amount used with the additives of the prior art, such as, for example, ethylglycol acetate (EGA), butylglycol acetate (BGA) and propylene glycol monomethyl ether acetate (PMA), for equivalent performance. Moreover, a better cost/benefit tradeoff is obtained, since the formulations using the dioxolane derivative of the present invention prove to be more economical.

Solvent-based coating systems suitable for the invention, with properties which are enhanced by the addition of a dioxolane derivative, in accordance with the present invention, include, for example, systems based on nitrocellulose, polyester, cellulose acetate butyrate (CAB), and polyurethane, epoxy, acrylic, melamine or phenolic systems.

Water-based architectural coatings suitable for the invention include vinyl, vinyl-acrylic, straight acrylic, and styrene acrylic systems.

The amount of one or more dioxolane derivatives that is used in a coating formulation is advantageously between about 0.1% and about 10% by weight, relative to the total weight of the paint, more particularly between about 0.1% and about 5%. In the architectural system, the amount of dioxolane derivative added is between 0.1% and 5% of the paint formulation.

Other advantages and details of the invention will emerge more clearly from a reading of the illustrative embodiment examples of the present invention that are given below, but without representing any limitation other than those contained in the appended claims.

EXAMPLES

Industrial Paints

Eight formulations were prepared according to table I below. The system is a polyurethane varnish, typically used as a coating for metal and wooden substrates, containing 65% of an isocyanate+polyol mixture, and 35% of a set of solvents. In the table, EGA signifies ethylglycol acetate, BGA signifies butylglycol acetate, and PMA signifies propylene glycol monomethyl ether acetate. Solketal is the dioxolane derivative used.

TABLE I

COMPARISON OF FORMULATIONS OF THE PRIOR ART (F1, F3, F5) WITH FORMULATIONS ACCORDING TO THE PRESENT INVENTION (F2, F4 AND F6)

| Solvents % (m/m) | F1 EGA | F2 Solketal | F3 PMA | F4 Solketal | F5 BGA | F6 Solketal |
|---|---|---|---|---|---|---|
| Ethyl acetate | 9.1 | 10.6 | 20.8 | 19.4 | 9.8 | 9.6 |
| Toluene | 22.8 | 22.8 | 9.8 | — | — | — |
| Butyl acetate | 18.9 | 20.8 | — | 24.1 | 26.0 | 26.0 |
| Xylene | 6.5 | 6.5 | 13.0 | 14.3 | 19.5 | 19.5 |
| AB 9 | 3.9 | 3.9 | 3.9 | 6.5 | 7.8 | 8.5 |
| PMA | — | — | 17.6 | — | — | — |
| Ethylglycol acetate | 3.9 | — | — | — | — | — |
| Butylglycol acetate | — | — | — | — | 2 | — |
| Solketal | — | 0.5 | — | 0.7 | — | 1.4 |
| Total solvents | 65.0 | 65.0 | 65.0 | 65.0 | 65.0 | 65.0 |
| Solids (isocyanate + polyol) % | 35.0 | 35.0 | 35.0 | 35.0 | 35.0 | 35.0 |

The term AB9 signifies an alkylbenzene compound containing an alkyl substituent containing 9 carbon atoms and sold by Shell under the name IR9. The toluene and xylene compounds are hydrocarbons sold by Petrobras.

The aspects tested were as follows:

a—Determination of the Percentage of Free NCO Over Time

This test is known to the skilled worker and determines whether the NCO functions react with the OH functions of the solvent. This determination is made by the back-titration technique, which involves adding a certain amount of amine to the paint. This amine reacts with the NCO functions to give a urea function; the unconverted amine is assayed by neutralization with an acid (hydrochloric acid). The % NCO is equal to the amount of amine added, reduced by the assayed amount of excess amine.

b—Drying Time of the Film on Metal Substrate:

This test evaluates the drying of a system, the results being presented as a function of time. These results are as follows:
  Dust-free drying—time when the surface no longer retains dust.
  Dry to touch—moment when the surface, when touched, no longer exhibits adhesion.
  Dry to handle—moment when the surface, exposed to a pressure more than touching, no longer exhibits deformations.

c—gloss:

The test defines the degree to which the finish of the surface approaches a theoretical ideal specular gloss, which can be considered to be a perfect mirror, based on an arbitrary value of 100.

d—Mechanical Strength and Chemical Resistance:

This measurement defines the degree of resistance of the surface after finishing to compression movements, expressed in cycles, using in the mechanical strength test a polish and in the chemical resistance test the solvent methyl ethyl ketone (MEK).

e—Cross-Cut, or Scoring, Adhesion:

These tests are carried out to verify the anchoring between the film layers, and are performed using a traveling device equipped with a number of parallel cutting blades fixed to a sleeve. Following complete drying of the surfaces, a series of cuts is made so as to produce 90° intersections, forming a grid. Subsequently, the scored areas have an adhesive tape applied to them, which is pulled off rapidly. A check is made as to whether the tape removes squares from the surface or coating.

f—Hardness of the Film Formed:

This measurement is carried out using a set of graphic pencils grouped according to increasing hardness from 8 B (softest) to 10 H (hardest). The film formed is scored with this set of pencils, and a check is made as to which is the hardness of the pencil that scores the film.

g—Flexibility by Bending on Conical Mandrel:

This test is carried out on an apparatus called a conical mandrel, which includes a lever over the whole extent of a conical cylinder. The test specimen is first attached to one end of the apparatus, and then bent. This test evaluates the behavior of the coating from the standpoint of flexibility.

h—Brookfield Viscosity of the Formulation:

This test is carried out on a Brookfield LV DV II viscometer. The viscosity is an important parameter both for the application and for the storage of the product.

Figure 1B:
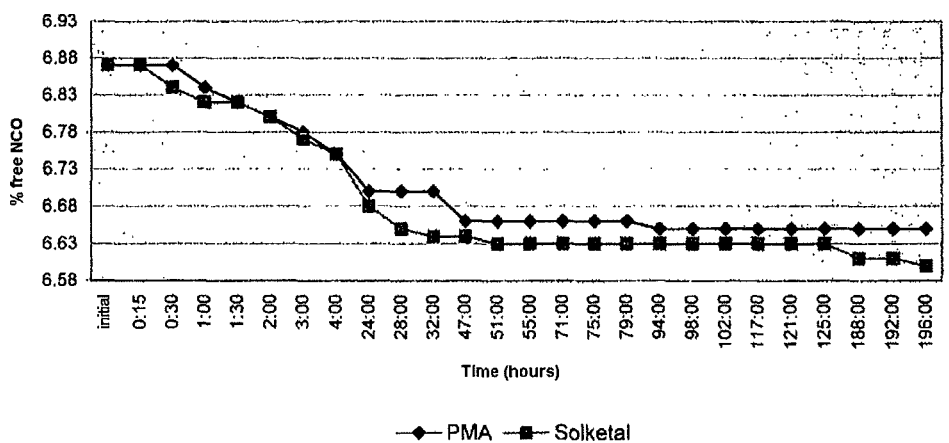
Figure 1C:
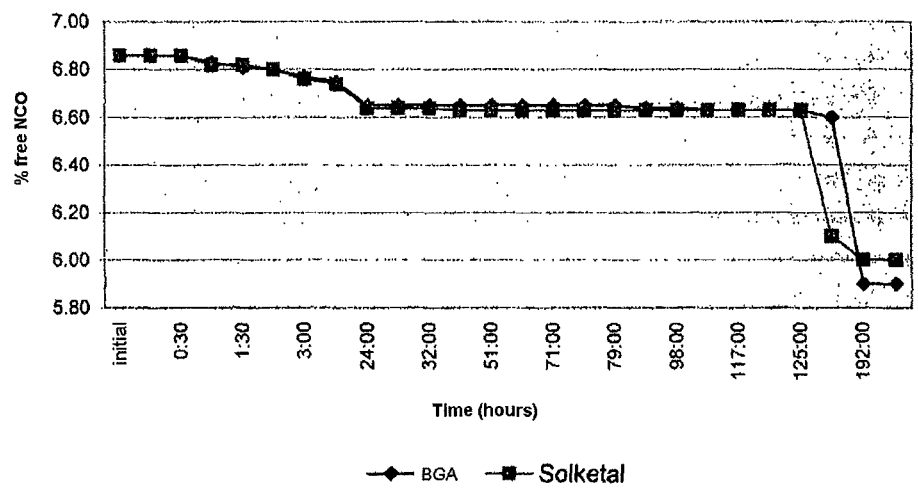
Figure 2A:
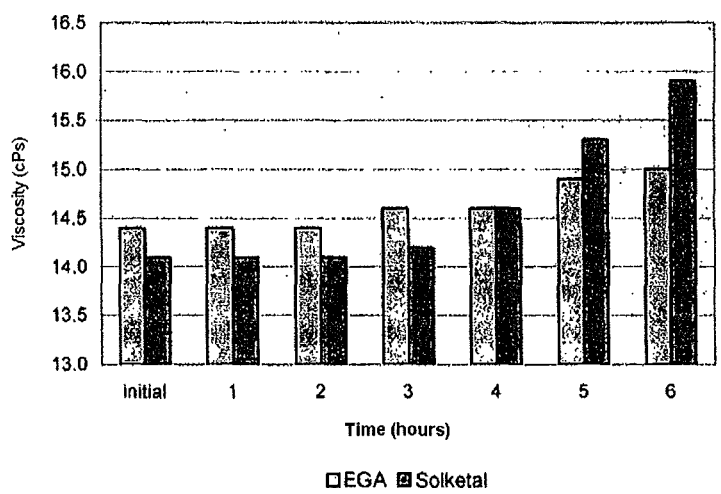
Figure 2B:
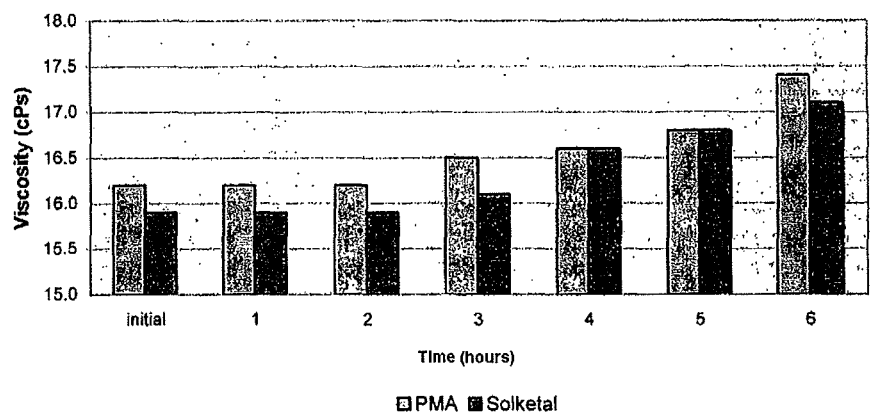
Figure 2C:
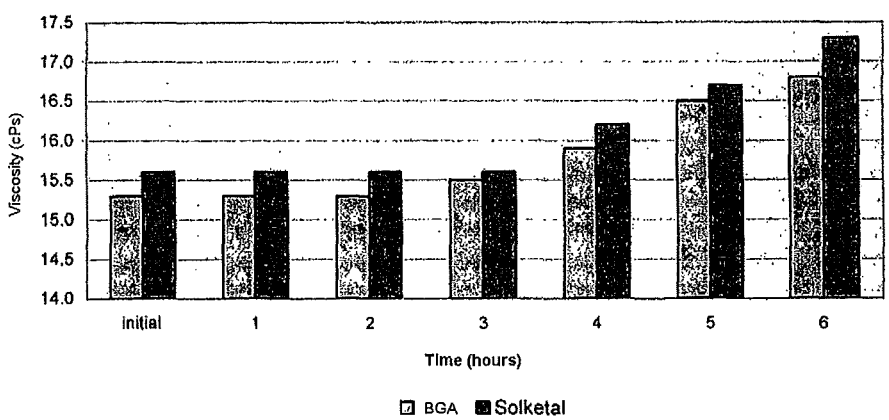

The results of these tests and measurements are indicated and illustrated in the tables below and the figures attached, in which:

FIGS. 1A to 1C represent the consumption of NCO function by the hydroxyl functions of the solvent for systems F1/F2 (FIG. 1A)

systems F3/F4 (FIG. 1B), and systems F5/F6 (FIG. 1C);

FIGS. 2A to 2C represent the comparative change in Brookfield viscosity of the test formulations of table 1 for:

systems F1/F2 (FIG. 2A)

systems F3/F4 (FIG. 2B), and systems F5/F6 (FIG. 2C).

The comparison of the drying times of the various systems tested is illustrated in tables 2A, 2B and 2C below:

TABLE 2A

RESULTS OF DRYING TIME FOR THE EGA SYSTEM

| Formula | Powder | Touch | Handle |
|---|---|---|---|
| F1 - EGA | 7 min | 4:20 hours | >8 hours |
| F2 - Solketal | 7 min | 4:20 hours | >8 hours |

TABLE 2B

RESULTS OF DRYING TIME FOR THE PMA SYSTEM

| Formula | Powder | Touch | Handle |
|---|---|---|---|
| F3 - PMA | 6 min | 4:00 hours | >8 hours |
| F4 - Solketal | 6 min | 4:00 hours | >8 hours |

TABLE 2C

RESULTS OF DRYING TIME FOR THE BGA SYSTEM

| Formula | Powder | Touch | Handle |
|---|---|---|---|
| F5 - BGA | 7 min | 4:30 hours | >8 hours |
| F6 - Solketal | 7 min | 4:30 hours | >8 hours |

Tables 3A, 3B and 3C collate the results obtained for the measurement of the gloss of each of the systems tested.

TABLE 3A

RESULTS OF GLOSS MEASUREMENTS FOR THE EGA SYSTEM

| | Angle | | |
|---|---|---|---|
| Formula | 20° | 60° | 85° |
| F1 - EGA | 77.9 | 92.5 | 96.4 |
| F2 - Solketal | 75.8 | 92.4 | 95.3 |

TABLE 3B

RESULTS OF GLOSS MEASUREMENTS FOR THE PMA SYSTEM

| | Angle | | |
|---|---|---|---|
| Formula | 20° | 60° | 85° |
| F3 - PMA | 57.1 | 89.8 | 86.8 |
| F4 - Solketal | 62.5 | 90.8 | 93.0 |

TABLE 3C

RESULTS OF GLOSS MEASUREMNTS FOR THE BGA SYSTEM

| | Angle | | |
|---|---|---|---|
| Formula | 20° | 60° | 85° |
| F5 - BGA | 72.1 | 89.4 | 88.0 |
| F6 - Solketal | 71.9 | 90.9 | 91.9 |

Tables 4A, 4B and 4C relate to the results of mechanical strength and chemical resistance of the films obtained with the formulations tested.

TABLE 4A

RESULTS OF THE MECHANICAL STRENGTH AND CHEMICAL RESISTANCE TESTS FOR THE EGA SYSTEM

| Formula | Mechanical strength | Chemical resistance |
|---|---|---|
| F1 - EGA<br>F2 - Solketal | Similar | Similar |

TABLE 4B

RESULTS OF THE MECHANICAL STRENGTH AND CHEMICAL RESISTANCE TESTS FOR THE PMA SYSTEM

| Formula | Mechanical strength | Chemical resistance |
|---|---|---|
| F3 - PMA<br>F4 - Solketal | Similar | Similar |

TABLE 4C

RESULTS OF THE MECHANICAL STRENGTH AND CHEMICAL RESISTANCE TESTS FOR THE BGA SYSTEM

| Formula | Mechanical strength | Chemical resistance |
|---|---|---|
| F5 - BGA<br>F6 - Solketal | Similar | Similar |

Tables 5A, 5B and 5C relate to the results of the score adhesion test of the formulas tested.

TABLE 5A

RESULTS OF SCORE ADHESION FOR THE EGA SYSTEM

| Formula | Score adhesion |
|---|---|
| F1 - EGA<br>F2 - Solketal | Similar |

TABLE 5B

RESULTS OF SCORE ADHESION FOR THE PMA SYSTEM

| Formula | Score adhesion |
|---|---|
| F3 - PMA<br>F4 - Solketal | Similar |

TABLE 5C

RESULTS OF SCORE ADHESION FOR THE BGA SYSTEM

| Formula | Score adhesion |
|---|---|
| F5 - BGA<br>F6 - Solketal | Similar |

Tables 6A, 6B and 6C document the results for hardness of the film obtained for the formulations tested.

TABLE 6A

RESULTS OF FILM HARDNESS FOR THE EGA SYSTEM

| Formula | F1 - EGA | F2 - Solketal |
|---|---|---|
| Resistance until<br>scoring | 3B<br>2B | 3B<br>2B |

TABLE 6B

RESULTS OF FILM HARDNESS FOR THE PMA SYSTEM

| Formula | F3 - PMA | F4 - Solketal |
|---|---|---|
| Resistance until<br>scoring | 3B<br>2B | 3B<br>2B |

TABLE 6C

RESULTS OF FILM HARDNESS FOR THE BGA SYSTEM

| Formula | F5 - BGA | F6 - Solketal |
|---|---|---|
| Resistance until<br>scoring | 3B<br>2B | 3B<br>2B |

Tables 7A, 7B and 7C present the results of the bending flexibility test for the formulations tested.

TABLE 7A

BENDING FLEXIBILITY RESULTS FOR THE EGA SYSTEM

| Formula | Flexibility |
|---|---|
| F1 - EGA<br>F2 - Solketal | Similar |

TABLE 7B

BENDING FLEXIBILITY RESULTS FOR THE PMA SYSTEM

| Formula | Flexibility |
|---|---|
| F3 - PMA<br>F4 - Solketal | Similar |

TABLE 7C

BENDING FLEXIBILITY RESULTS FOR THE BGA SYSTEM

| Formula | Flexibility |
|---|---|
| F5 - BGA<br>F6 - Solketal | Similar |

The results above show clearly that the formulas in accordance with the present invention which contain reduced amounts of film-forming additives (solketal) relative to a principal solvent in the formulas of the prior art exhibit performances and properties which are equivalent with regard to the various aspects tested, especially when the solvents of the prior art are EGA, PMA, and BGA.

Architectural Paints

This section of examples aims to compare, within architectural paints, the use of the coalescents Texanol (2,2,4-trimethyl-1,3-pentanediol monobutyrate, CAS No. 25265-77-4, sold by Eastman Chemical Company), known in the prior art, and IIPG (CAS No. 5694-81-5), according to the present invention.

The sections below illustrate:

a) Three resin systems commonly sold in the paints market—straight acrylic, styrene acrylic or vinyl acrylic base—and their respective polymerization processes. These polymerization processes, and also the equipment employed for this purpose, are commonplace and known to the skilled worker. A set of appropriate apparatus is composed essentially of a polymerization reactor, equipped with a heating/cooling system and respective controls, a condenser, a reservoir for the various starting materials and the respective metering devices, pumps, and an inertization system.

b) Given that paint bases comprising coalescents are existing commercial products, three paint bases are provided, comprising the abovementioned systems, in two series. In a first series, each of the resin systems is admixed with 2% by weight of Texanol coalescent, and, in a second series, each of the three resin systems is admixed with 2% by weight of IIPG coalescent.

c) Comparative tests are carried out for each of these six paint bases admixed with coalescent: stability of pH, stability of viscosity, variation in MFFT as a function of coalescent concentration.

d) A series of three architectural paint formulations, selected from the bases above, containing an addition of 2% by weight of Texanol—as products of the prior art, and, to allow comparison, another series of three architectural paint formulations containing an addition of 2% by weight of IIPG—as products formulated in accordance with the teachings of the present invention.

e) Comparative tests are carried out on the six formulations: stability of pH, stability of viscosity, abrasion resistance, and variation in gloss.

TABLE II

FORMULATION OF STRAIGHT ACRYLIC BASE RESIN SYSTEM

| COMPONENT | % BY WEIGHT |
|---|---|
| Action: CHARGE | |
| Water | 14.56 |
| Ammonium salt of sulfated nonylphenol ethoxylate CAS No. 68649-55-8(1) | 0.66 |
| Sodium allyloxyhydroxypropylsulfonate - CAS No. 52556-42-0(2) | 0.41 |
| Action: PRE-MIX - 45 MIN - 180 RPM | |
| Ammonium salt of sulfated nonylphenol ethoxylate - CAS No. 68649-55-8(1) | 3.31 |
| Sodium allyloxyhydroxypropylsulfonate - CAS No. 52556-42-0(2) | 0.35 |
| Acrylic acid - CAS No. 79-10-7 | 0.98 |
| n-Butyl acrylate - CAS No. 141-32-2 | 22.11 |

TABLE II-continued

FORMULATION OF STRAIGHT ACRYLIC BASE RESIN SYSTEM

| COMPONENT | % BY WEIGHT |
|---|---|
| Methyl methacrylate - CAS No. 80-62-6 | 25.95 |
| Water | 17.58 |
| Action: 1st ADDITION OF CATALYST | |
| Water | 11.16 |
| Ammonium persulfate - CAS No. 7727-54-0 | 0.36 |
| Action: 2nd ADDITION OF CATALYST | |
| Water | 0.48 |
| Ammonium persulfate - CAS No. 7727-54-0 | 0.10 |
| Action: ADJUSTMENT OF pH | |
| 25% ammonium hydroxide - CAS No. 1336-21-6 | 0.98 |
| Water | 0.98 |

The following polymerization is carried out:
1. Place the reactants of the charge in the reactor.
2. Carry out stirring of the reactor, under inertization, after having started up the condenser.
3. Heat to an appropriate temperature, 80° C. for example.
4. Add the monomers at the same time as the water and the surfactants, to give the pre-emulsion (premix).
5. Slowly add catalyst 1.
7. Slowly add catalyst 2.
8. Finally, adjust the pH to between 8.7 and 9.2.

In the figures, the references SR1 and SR2 indicate the resin systems which here are called straight acrylic according to table II above, containing respectively 2% by weight of Texanol and 2% by weight of IIPG.

TABLE III

FORMULATION OF STYRENE-ACRYLIC BASE RESIN SYSTEM

| COMPONENT | % BY WEIGHT |
|---|---|
| Action: CHARGE | |
| Water | 32.10 |
| Ammonium salt of sulfated nonylphenol ethoxylate CAS No. 68649-55-8(1) | 0.64 |
| Sodium allyloxyhydroxypropylsulfonate - CAS No. 52556-42-0(2) | 0.14 |
| Branched polyoxyethylene(9) nonylphenyl ether CAS No. 68412-54-4 (3) | 0.44 |
| TDDM (tert-dodecyl mercaptan) CAS No. 25103-58-6 | 0.21 |
| Water | 0.10 |
| Acetic acid - CAS No. 64-19-7 | 0.02 |
| Water | 9.42 |
| Action: PRE-MIX - 45 MIN - 180 RPM | |
| Ammonium salt of sulfated nonylphenol ethoxylate - CAS No. 68649-55-8(1) | 1.68 |
| Branched polyoxyethylene(9) nonylphenyl ether CAS No. 68412-54-4 (3) | 0.71 |
| Acrylic acid - CAS No. 79-06-1 | 1.413z |
| Water | 0.79 |
| Ammonium persulfate - CAS No. 7727-54-0 | 0.31 |
| Water | 2.62 |
| Methacrylic acid - CAS No. 79-41-4 | 1.47 |
| n-Butyl acrylate - CAS No. 141-32-2 | 23.33 |
| Styrene - CAS No. 100-42-5 | 21.76 |
| Action: addition of catalyst solution | |
| Ammonium persulfate - CAS No. 7727-54-0 | 0.79 |
| Water | 0.18 |
| Action: Adjustment of pH | |
| 25% ammonium hydroxide - CAS No. 1336-21-6 | 0.94 |
| Water | 0.94 |

TABLE III-continued

FORMULATION OF STYRENE-ACRYLIC BASE RESIN SYSTEM

| COMPONENT | % BY WEIGHT |
|---|---|

POLYMERIZATION PROCESS

1. Place the reactants of the charge in the reactor.
2. Carry out stirring of the reactor, under inertization, after having started up the condenser.
3. Heat to an appropriate temperature, 80° C. for example.
4. Add the monomers at the same time as the water and the surfactants, to give a pre-emulsion (premix).
5. Slowly add the catalyst solution.
6. Finally, adjust the pH to between 8.5 and 9.

In the figures, the references SR3 and SR4 indicate the styrene acrylic resin systems according to table III above, containing respectively 2% by weight of Texanol and 2% by weight of IIPG.

TABLE IV

FORMULATION OF VINYL ACRYLIC BASE RESIN SYSTEM

| COMPONENT | % BY WEIGHT |
|---|---|
| Action: CHARGE | |
| Water | 32.29 |
| Ammonium salt of sulfated nonylphenol ethoxylate CAS No. 68649-55-8(1) | 3.52 |
| Sodium allyloxyhydroxypropylsulfonate - CAS No. 52556-42-0(2) | 1.30 |
| Branched polyoxyethylene(9) nonylphenyl ether CAS No. 68412-54-4 (3) | 1.15 |
| Sodium acetate (anhydrous - CAS No. 127-09-3) | 0.15 |
| Ammonium persulfate - CAS No. 7727-54-0 | 0.06 |
| Sodium bicarbonate - CAS No. 144-55-8 | 0.09 |
| Action: Addition of monomers | |
| Vinyl acetate- CAS No. 108-05-4 | 36.50 |
| Butyl acrylate - CAS No. 141-32-2 | 15.64 |
| Action: addition of catalyst solution | |
| Water | 6.92 |
| Sodium bicarbonate - CAS No. 144-55-8 | 0.09 |
| Ammonium persulfate - CAS No. 7727-54-0 | 0.22 |
| Action: addition of redox solution | |
| Water | 1.44 |
| 70% tert-Butyl hydroperoxide - CAS No. 75-91-2 (4) | 0.04 |
| Action: addition of redox solution | |
| Water | 00.58 |
| 99% Sodium formaldehyde sulfoxylate - CAS No. 149-44-0 (5) | 0.02 |

POLYMERIZATION PROCESS
1. Place the reactants of the charge in the reactor.
2. Carry out stirring of the reactor, under inertization, after having started up the condenser.
3. Heat to an appropriate temperature, 80° C. for example.
4. Add the monomers.
5. Slowly add the catalyst solution.
6. Add the redox solution.

In the figures, the references SR5 and SR6 indicate the vinyl acrylic resin systems according to table III above, containing respectively 2% by weight of Texanol and 2% by weight of IIPG.

TABLE V

SEMIGLOSS PAINT FORMULATION BASE

| COMPONENT | FUNCTION | % BY MASS |
|---|---|---|
| Water | Solvent | 26.90 |
| Sodium hexametaphosphate CAS No. 10124-56-8 | Ionic dispersant | 0.10 |
| Neutralized, low molecular weight polyacrylate (6) CAS No. 9003-04-7 | Polyelectrolyte dispersant | 0.20 |
| Branched polyoxyethylene(9) nonylphenyl ether CAS 68412-54-4 (3) | Humectant | 0.20 |
| Solvent-dewaxed heavy paraffin, distilled from petroleum CAS No. 64742-65-0 (7) | Antifoam | 0.20 |
| Titanium dioxide CAS No. 13463-67-7 | Pigment | 14.00 |
| Precipitated calcium carbonate CAS No. 471-34-1 | Filler | 3.00 |
| Natural calcium carbonate CAS No. 1317-65-3 | Filler | 7.00 |
| Agalmatolite CAS No. 12284-46-7 | Filler | 1.00 |
| Ammonium hydroxide CAS No. 1336-21-6 | Alkalifying agent | 0.20 |
| 1,2-Benziso-3-thiazolinone CAS No. 2634-33-5 (8) | Biocide | 0.10 |
| Hydrophobically modified, nonionic urethane polyethylene oxide (9) | Low-shear thickener | 1.70 |
| Hydrophobically modified anionic thickener emulsion (10) | High-shear thickener | 0.40 |

PVC (Pigment volume content) = 26

In the figures, the references F1 and F2 indicate paint formulations containing a 45/55 by weight ratio of the straight acrylic resin system of table II above and of the semigloss paint formulation base of table V above, containing respectively an addition of 2% by weight of Texanol, and an addition of 2% by weight of IIPG.

Likewise, the references F3 and F4 indicate paint formulations containing a 45/55 by weight ratio of the styrene acrylic resin system of table III above and of the semigloss paint formulation base of table V above, containing respectively an addition of 2% by weight of Texanol, and an addition of 2% by weight of IIPG.

TABLE VI

MATT PAINT FORMULATION BASE

| COMPONENT | FUNCTION | % BY MASS |
|---|---|---|
| Water | Solvent | 38.95 |
| Sodium hexametaphosphate CAS No. 10124-56-8 | Ionic dispersant | 0.05 |
| Neutralized, low molecular weight polyacrylate (6) CAS No. 9003-04-07 | Polyelectrolyte dispersant | 0.40 |
| Branched polyoxyethylene(9) nonylphenyl ether CAS 68412-54-4 (3) | Humectant | 0.10 |
| Sodium nitrite CAS No. 7632-00-0 | Anticorrosive | 0.05 |
| Solvent-dewaxed heavy paraffin, distilled from petroleum CAS No. 64742-65-0 (7) Rhodoline 681F | Antifoam | 0.20 |
| Hydroxyethylcellulose CAS No. 9004-62-00 | Cellulosite thickener | 0.30 |
| Titanium dioxide CAS No. 13463-67-7 | Pigment | 10.00 |
| Precipitated calcium carbonate CAS No. 471-34-1 | Filler | 6.00 |
| Natural calcium carbonate CAS No. 1317-65-3 | Filler | 14.00 |
| Agalmatolite CAS No. 12284-46-7 | Filler | 10.00 |
| Ammonium hydroxide CAS No. 1336-21-6 | Alkalifying agent | 0.20 |
| 1,2-Benziso-3-thiazolinone CAS No. 2634-33-5 (8) | Biocide | 0.10 |
| Hydrophobically modified, nonionic urethane polyethylene oxide (9) | Low-shear thickener | 1.70 |
| Hydrophobically modified anionic thickener emulsion (10) | High-shear thickener | 0.40 |

PVC (Pigment volume content) = 61
(1) ABEX EP110 - anionic surfactant - sold by Rhodia Poliamida e Especialidades, Brazil.
(2) SIPOMER COPS 1 - stabilizer - sold by Rhodia Poliamida e Especialidades, Brazil.
(3) IGEPAL CO-630 - nonionic surfactant - sold by Rhodia Poliamida e Especialidades, Brazil.
(4) TRIGONOX AW 70 - catalyst - sold by Akzo Nobel.
(5) LUREDOX RC 99% - catalyst - sold by BASF.
(6) Rhodoline 211 - polyelectrolyte dispersant, sold by Rhodia North America, USA
(7) Rhodoline 681F - antifoam, sold by Rhodia North America, USA
(8) PROXEL GLX - Biocide, sold by Avecia Group Plc.
(9) Acrysol RM-5000 - rheological additive, sold by Rohm and Haas.
(10) Acrysol ™ TT 935 - rheological additive, sold by Rohm and Haas.

In the figures, the references F5 and F6 indicate paint formulations containing an 18/82 by weight ratio of the vinyl acrylic resin system of table IV above and of the matt paint formulation base of table VI above, containing respectively an addition of 2% by weight of Texanol, and an addition of 2% by weight of IIPG.

A description will now be given of the analytical methods used to test the resin systems and paints described above.

Process for Evaluating the Abrasion Resistance

1. To a glass plate of 20×50 cm, fix a Leneta P 121-10N test panel (sold by The Leneta Company, USA), after having cleaned the glass with an alcohol wipe;
2. Clean the test panel with an alcohol wipe;
3. Place a spreader (film 175 μm in thickness) in the center of the Leneta panel on the upper part of the test panel;
4. Place the reference sample from the left to the center of the spreader;
5. Place the sample for evaluation on the right-hand side of the test panel.
6. Manually draw down the spreader at a rate of 3 to 5 seconds until the bottom part of the test panel is reached. This process must be repeated three times for each sample;
7. Leave the applied sample to dry in a controlled climatic atmosphere (temperature 22±2° C. and relative humidity 55±5%) for 7 days;
8. When this period has elapsed, fix the test panel for evaluation on the inside of the platen, on the glass plate of the GAT apparatus (Gardner Abrasion Tester—manufactured in accordance with standard ASTM D-2486), with the sanded glass part facing upward;
9. Weigh out 10 g of abrasive paste (prepared in accordance with standard NBR 14940) onto the brush and install the brush in the apparatus. Add 10 ml of demineralized water over the extent of the test panel, and begin the starting operation, after having set the cycle counter to zero and connected the apparatus;

10. A cycle is composed of each back-and-forth stroke of the brush, and the wear of the paint is noted when the brush removes all of the paint applied, from one extent to the other, completely revealing the black background of the Leneta panel in a continuous line;

11. At each 400 cycles the apparatus stops automatically. At this point, remove the brush, without washing it. Apply a further 10 g of abrasive paste and 10 ml of demineralized water over the pathway of the brush.

This process should be carried out until the end of the test. Counting of cycles should be stopped when the first sign is observed of joining between the wear lines of the paint under analysis.

Process for Evaluating the MFFT (Minimum Film Formation Temperature)

Apparatus used: Rhopoint MFFT bar 60, with 6 temperature stages between −5° C. to +60° C. Evaluation performed in accordance with standard ASTM D-2354 65T.

1. Lift up the glass cover covering the heating platen of the apparatus;
2. Spread a uniform layer of propylene glycol over the heating platen, using a brush;
3. Cut out a piece of aluminum foil, place it on the heating platen with the layer of propylene glycol, smoothing it well in order to give it a uniform appearance and cause it to adhere firmly to the platen;
4. Clean the surface of the aluminum foil with a piece of paper soaked with ethanol, and then dry the surface;
5. Lower the cover, connect the apparatus and regulate the temperature on the appropriate stage, by opening the water valve to control the temperature;
6. Following stabilization of the temperature, apply nitrogen at a rate of 4 liters per minute at a pressure of 4 bar, to remove the humidity from the surface of the platen;
7. Lift up the cover and, using a spreader for a 75 μm film per 1.5 cm width, apply at least three parallel layers of the sample under analysis; Close the cover and, with the nitrogen connected, wait for complete drying of the dispersion;
8. After drying, use a spatula to verify the passage from the point where the film is friable to the point where it is flexible and continuous;
9. Move the guide rule of the apparatus to this point and read off the corresponding temperature on the scale of the apparatus, in ° C.
10. Repeat this operation on the other layers applied, and take the arithmetic mean.

Method of Evaluating the Stability

1. Homogenize the sample using a spatula;
2. Add the sample for evaluation to fill about 90% of a 250 ml flask;
3. Place a plastic film over the opening of the flask and close off with the cover to prevent escape of vapors;
4. Keep the flask in an oven at 60° C. for 1 month;
5. Every 7 days, remove the flask from the oven, wait for it to stabilize to the ambient temperature, and check the changes in the following properties:
   color and odor;
   phase separation, formation of surface liquid and/or settling;
   if there is no phase separation, measure the viscosity and the pH.

Process for Measuring the pH

1. With the pH measurement apparatus connected and calibrated, insert the pH measurement electrode directly onto the sample.
2. Wait for 1 minute for the apparatus to stabilize.
3. Read off the pH.

Process for Measuring the Brookfield Viscosity

Apparatus: Brookfield viscometer

1. Leave a sample of approximately 400 ml in a thermostatic bath at 25° C. for 2 hours. When this time has elapsed, homogenize the sample using a glass rod and check with a thermometer that the sample is at 25° C.;
2. Transfer the sample to a 600 ml glass beaker up to the 400 ml mark.
3. Select the appropriate spindle for reading the viscosity, such that the reading displayed on the dial of the apparatus is between 20% and 80%
4. Attach the spindle to the apparatus and centralize it in the flask; adjust the height of immersion by the mark on the rod;
5. Take a reading for one minute.

The viscosity value is expressed in centipoises (cPs).

Process for Measuring the Krebs Viscosity

Equipment used: Stormer viscometer

1. Leave a sample in a thermostat bath at 25° C. for 2 hours.
2. When this time has elapsed, homogenize the sample using a glass rod and verify if it is at 25° C.
3. Place the sample in the viscometer and insert the spindle, which is to take the measurement, up to the existing mark on the spindle, by lowering the lever of the apparatus.
4. When the lever is lowered, the equipment begins taking the measurement, which must last for 1 minute, marked on a stopwatch.

Process for Measuring the Gloss

Apparatus used—Gardner Micro-TRI-gloss Glossmeter. Process in accordance with standards ASTM D 523 and ASTM D2457.

1. On a glass plate of 20×50 cm, attach a Leneta P 121-10N test panel (sold by The Leneta Company, USA), after cleaning of the glass with an alcohol wipe;
2. Clean the test panel with an alcohol wipe;
3. Place a spreader (of 175 μm film thickness) in the center of the Leneta panel on the top part of the test panel;
4. Place the paint in the spreader, going from left to right;
5. Draw down the spreader manually at a rate of 3 to 5 seconds down to the bottom part of the test panel;
6. Leave the applied sample to dry in a controlled climatic atmosphere (temperature 22±2° C. and relative humidity of 55±5%) for 7 days;
7. Connect the gloss apparatus, set the angle at 60°, and adjust to make twenty readings;
8. Take the measurements at different points of the film, so that the final average is a reliable value;
9. Consider the gloss value as being the average of the measurements.

FIGURES

Figure 3C:
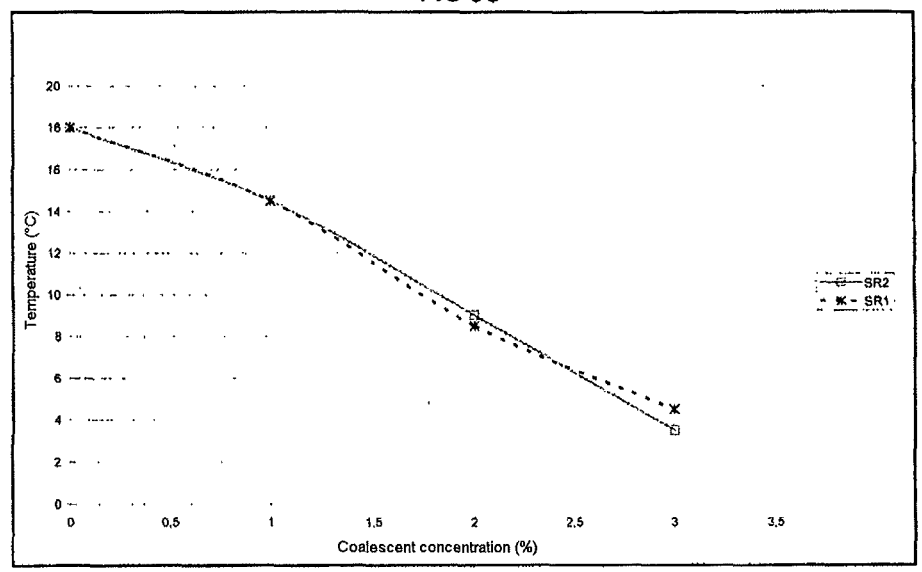
Figure 4A:
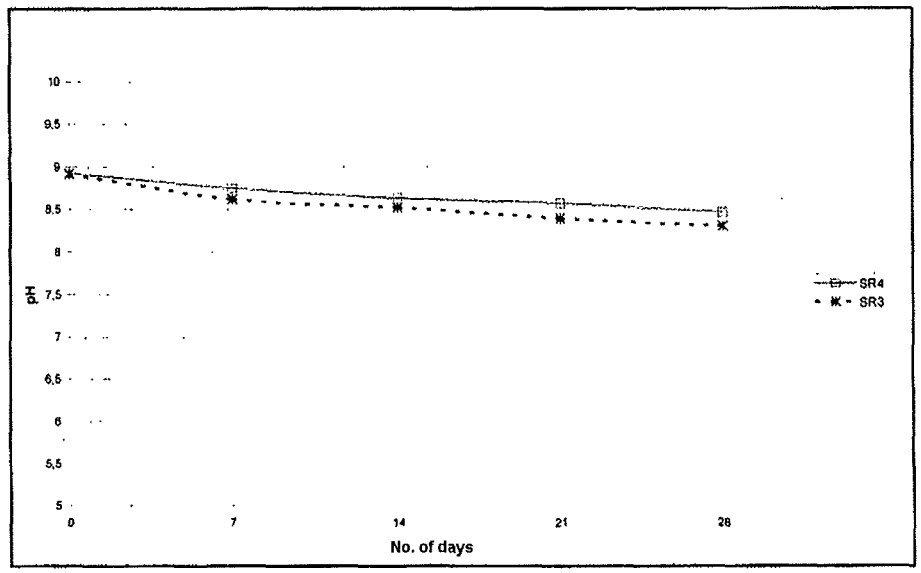
Figure 6D:
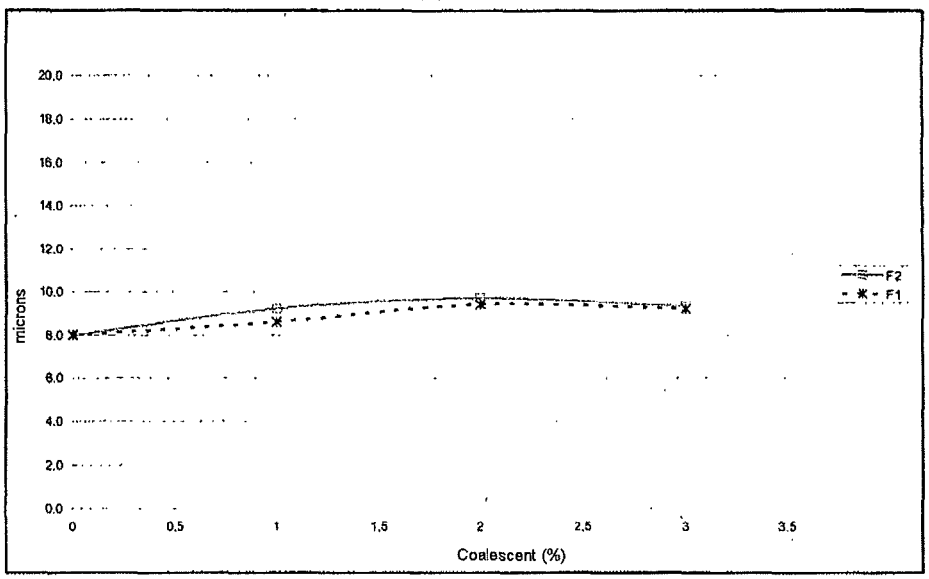
Figure 7A:
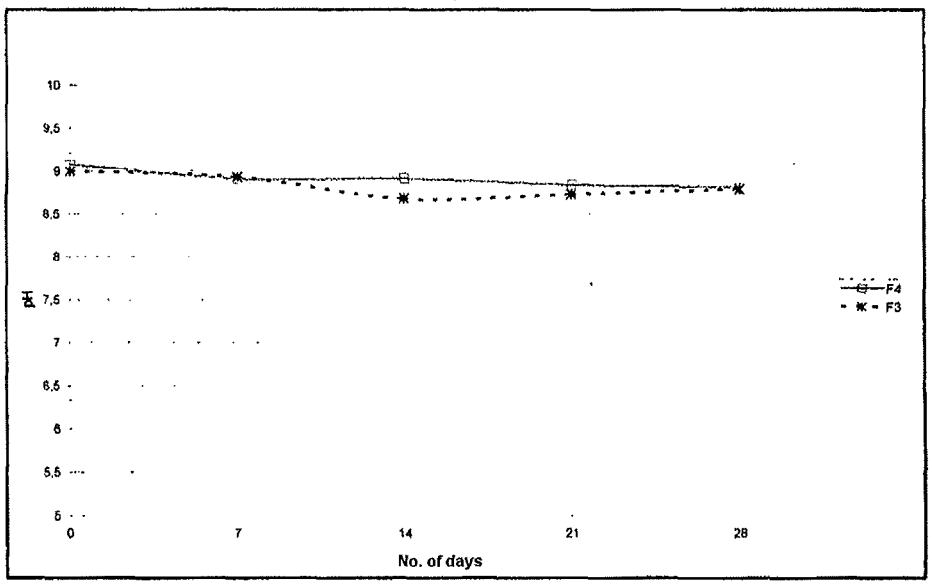
Figure 7D:
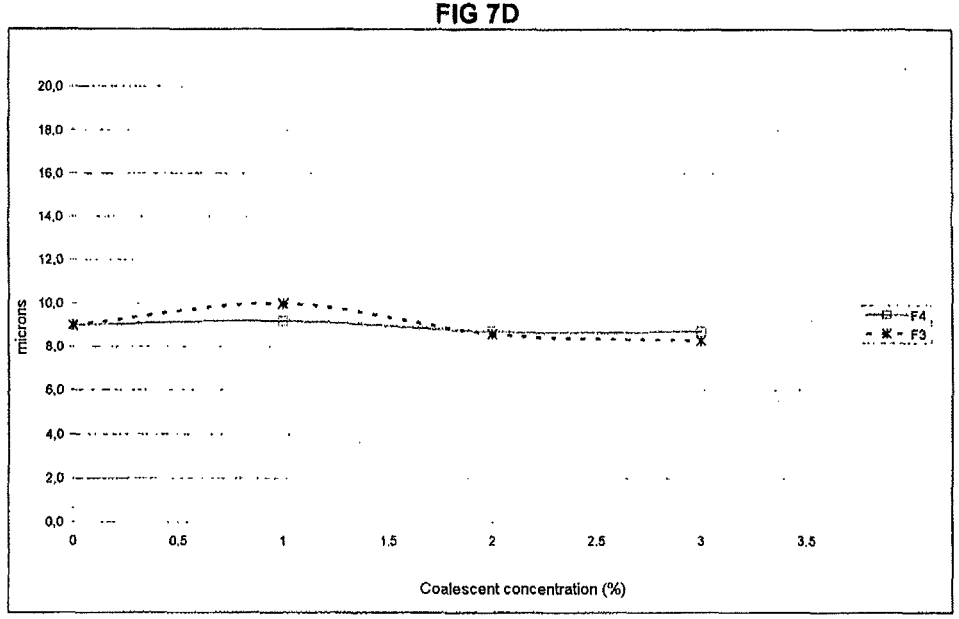
Figure 8A:
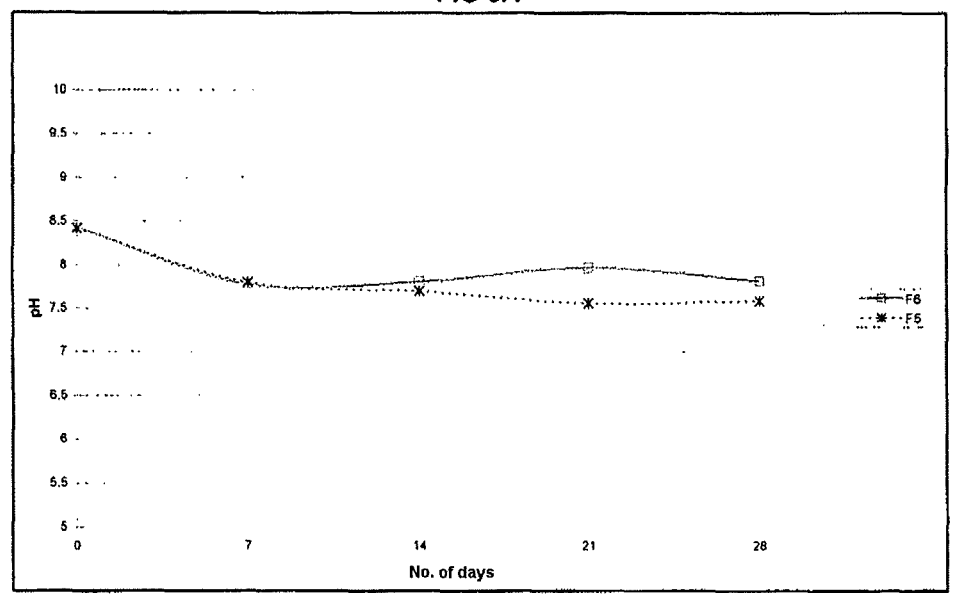

The figures contain the following information:
FIG. 3A—straight acrylic resin—stability of pH
FIG. 3B—straight acrylic resin—stability of Brookfield viscosity
FIG. 3C—straight acrylic resin—variation of MFFT as a function of coalescent concentration
FIG. 4A—styrene acrylic resin—stability of pH
FIG. 4B—styrene acrylic resin—stability of Brookfield viscosity
FIG. 4C—styrene acrylic resin—variation of MFFT as a function of coalescent concentration
FIG. 5A—vinyl acrylic resin—stability of pH
FIG. 5B—vinyl acrylic resin—stability of Brookfield viscosity
FIG. 5C—vinyl acrylic resin—variation of MFFT as a function of coalescent concentration FIG. 6A—straight acrylic paint—stability of pH
FIG. 6B—straight acrylic paint—stability of Krebs viscosity
FIG. 6C—straight acrylic paint—abrasion resistance (cycles)
FIG. 6D—straight acrylic paint—variation of gloss at 60°
FIG. 7A—styrene acrylic paint—stability of pH
FIG. 7B—styrene acrylic paint—stability of Krebs viscosity (KU)
FIG. 7C—styrene acrylic paint—abrasion resistance (cycles)
FIG. 7D—styrene acrylic paint—variation of gloss at 60°
FIG. 8A—vinyl acrylic paint—stability of pH
FIG. 8B—vinyl acrylic paint—stability of Krebs viscosity
FIG. 8C—vinyl acrylic paint—abrasion resistance (cycles)
FIG. 8D—vinyl acrylic paint—variation of gloss at 60°

CONCLUSIONS

Both in the resin systems admixed with the coalescents that compare a prior-art agent with an agent in accordance with the subject matter of the present invention, and in the paint formulations containing these resin systems and additional quantities of these coalescents, it is observed that the dioxolane derivatives according to the present invention exhibit properties which are equivalent and are entirely compatible with their use as a coalescent in architectural paints.

It is understood that, with the aid of the information and examples provided here, a skilled worker is able to make variations in the present invention which, while without being expressly provided or claimed, nevertheless, in spite of the different form, fulfill a similar function to achieve results of the same order of magnitude, and which are therefore included within the scope of the protection indicated in the attached claims.

The invention claimed is:

1. A coating composition comprising at least one dioxolane compound having the formula (I):

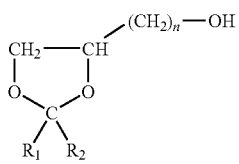

in which $R_1$ and $R_2$, which may be identical or different, are each a hydrogen atom or an alkyl, alkenyl or phenyl radical, and n is an integer 1, 2, 3, 4 or 5, and
 a nitrocellulose, a polyester, or a cellulose acetate butyrate (CAB), or
 a polyurethane, an epoxy, an acrylic, a melamine, or a phenolic-formulation, or
 a vinyl, a vinyl-acrylic, a straight acrylic, or a styrene acrylic formulation.

2. The coating composition as defined by claim 1, where, in formula (I), $R_1$ and $R_2$ are methyl, ethyl, n-propyl, isopropyl or isobutyl radicals.

3. The coating composition as defined by claim 1, where, in formula (I), n is 1 or 2.

4. The coating composition as defined by claim 1, said at least one dioxolane compound comprising 2,2-dimethyl-1,3-dioxolane-4-methanol.

5. The coating composition as defined by claim 1, said at least one dioxolane compound comprising 2,2-diisobutyl-1,3-dioxolane-4-methanol.

6. The coating composition as defined by claim 1, wherein said composition is formulated as a paint or varnish.

7. The coating composition as defined by claim 1, wherein said composition is formulated as an industrial, graphic or architectural paint.

8. The coating composition as defined by claim 1, wherein said composition is a water-based formulation.

9. The coating composition as defined by claim 1, wherein said composition is a solvent-based formulation.

10. The coating composition as defined by claim 1, wherein said at least one dioxolane compound comprises from 0.1% to 10% by weight of said composition.

11. A method of coating a composition, the method comprising applying the composition as defined by claim 1 to the surface of said composition.

12. A method of making a composition, the method comprising adding to a coating formulation at least one dioxolane compound having the formula (I):

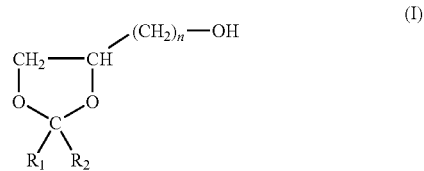

in which $R_1$ and $R_2$, which may be identical or different, are each a hydrogen atom or an alkyl, alkenyl or phenyl radical, and n is an integer 1, 2, 3, 4 or 5,
 wherein the coating formulation is based on
 a nitrocellulose, a polyester, or a cellulose acetate butyrate (CAB) system, or
 a polyurethane, an epoxy, an acrylic, a melamine, or a phenolic system, or
 a vinyl, a vinyl-acrylic, a straight acrylic, or a styrene acrylic system.

13. A method of retarding the drying of a coating composition, the method comprising adding to a coating formulation at least one dioxolane compound having the formula (I):

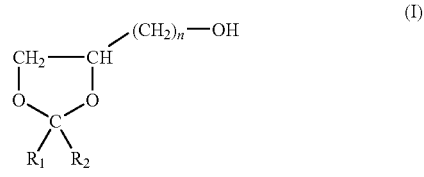

in which $R_1$ and $R_2$, which may be identical or different, are each a hydrogen atom or an alkyl, alkenyl or phenyl radical, and n is an integer 1, 2, 3, 4 or 5,
 wherein the coating formulation is based on
 a nitrocellulose, a polyester, or a cellulose acetate butyrate (CAB) system, or a
 polyurethane, an epoxy, an acrylic, a melamine, or a phenolic system, or
 a vinyl, a vinyl-acrylic, a straight acrylic, or a styrene acrylic formulation
and applying said composition to a substrate.

* * * * *